(12) United States Patent
Huang et al.

(10) Patent No.: US 11,606,472 B2
(45) Date of Patent: Mar. 14, 2023

(54) PROJECTION DEVICE AND SPATIAL IMAGING METHOD

(71) Applicant: CHENGDU IDEALSEE TECHNOLOGY CO., LTD., Chengdu (CN)

(72) Inventors: Qinhua Huang, Chengdu (CN); Haitao Song, Chengdu (CN)

(73) Assignee: CHENGDU IDEALSEE TECHNOLOGY CO., LTD., Chengdu (CN)

( * ) Notice: Subject to any disclaimer, the term of this patent is extended or adjusted under 35 U.S.C. 154(b) by 676 days.

(21) Appl. No.: 16/492,846

(22) PCT Filed: Mar. 19, 2018

(86) PCT No.: PCT/CN2018/079432
§ 371 (c)(1),
(2) Date: Sep. 10, 2019

(87) PCT Pub. No.: WO2018/171542
PCT Pub. Date: Sep. 27, 2018

(65) Prior Publication Data
US 2020/0271922 A1    Aug. 27, 2020

(30) Foreign Application Priority Data
Mar. 20, 2017    (CN) .......................... 201710165671.7

(51) Int. Cl.
*H04N 5/66* (2006.01)
*H04N 1/12* (2006.01)
(Continued)

(52) U.S. Cl.
CPC ......... *H04N 1/1205* (2013.01); *G02B 26/103* (2013.01); *G06T 7/521* (2017.01);
(Continued)

(58) Field of Classification Search
CPC .............. H04N 1/1205; H04N 1/1936; H04N 1/19542; H04N 3/02; H04N 5/66; G06T 7/521; G02B 26/103; G09G 3/02
(Continued)

(56) References Cited

U.S. PATENT DOCUMENTS

| 3,746,840 A | 7/1973 | Ogland et al. |
| 6,518,997 B1* | 2/2003 | Chow ................ H05K 13/0813 348/126 |
| 10,890,762 B2* | 1/2021 | Kusanagi ................. G09G 5/00 |

FOREIGN PATENT DOCUMENTS

| AU | 2006200812 A1 | 9/2007 |
| CN | 1873470 A | 12/2006 |
(Continued)

OTHER PUBLICATIONS

International Search Report and Written Opinion in PCT/CN2018/079432. dated May 24, 2018. 11 Pages with English translation.

*Primary Examiner* — Trang U Tran
(74) *Attorney, Agent, or Firm* — Meunier Carlin & Curfman LLC

(57) ABSTRACT

Disclosed are a projection device and a spatial imaging method. The projection device includes: an optical fiber scanner array; a light source located on an incident light path of the optical fiber scanner array; and an adjustment and control module assembly configured to couple, according to a virtual scene to be displayed, light emitted by the light source into the optical fiber scanner array, and to control the optical fiber scanner array to project pencil beams to a plurality of virtual object points corresponding to the virtual scene and located in space, such that multiple pencil beams projected to each virtual object point form a bundle of emitting light beams.

12 Claims, 3 Drawing Sheets

(51) Int. Cl.
  *G02B 26/10* (2006.01)
  *G09G 3/02* (2006.01)
  *H04N 3/02* (2006.01)
  *H04N 1/195* (2006.01)
  *H04N 1/193* (2006.01)
  *G06T 7/521* (2017.01)
(52) U.S. Cl.
  CPC ............ *G09G 3/02* (2013.01); *H04N 1/1936* (2013.01); *H04N 1/19542* (2013.01); *H04N 3/02* (2013.01)
(58) Field of Classification Search
  USPC ........................................................ 348/804
  See application file for complete search history.

(56) References Cited

FOREIGN PATENT DOCUMENTS

| | | | |
|---|---|---|---|
| CN | 101086608 | A | 12/2007 |
| CN | 101859061 | A | 10/2010 |
| CN | 102497571 | A | 6/2012 |
| CN | 103984089 | A | 8/2014 |
| CN | 106164748 | A | 11/2016 |
| EP | 0311843 | A2 | 4/1989 |

\* cited by examiner

PROJECTION DEVICE AND SPATIAL IMAGING METHOD

This application is a national stage application filed under 35 U.S.C. § 371 of PCT/CN2018/079432, filed Mar. 19, 2018, which claims the benefit of CN 201710165671.7, entitled "Projection Device and Spatial Imaging Method" and filed on Mar. 20, 2017, the contents of both applications are incorporated herein by reference in their entirety.

FIELD OF THE INVENTION

The present disclosure relates to the technical field of projection display, and in particular, to a projection device and a spatial imaging method.

BACKGROUND OF THE INVENTION 3D is an abbreviation of three-dimensional, i.e., three-dimensional graphics. At present, the mainstream 3D stereoscopic display technology still cannot enable us to get rid of the constraint of specific-purpose glasses, which limits the application range thereof and reduces the use comfort thereof; and moreover, many 3D technologies cause feelings such as nausea and vertigo for long-time viewers.

The glasses-free 3D technology can be divided into barrier 3D technology, lenticular lens 3D technology and directional backlight 3D technology. The greatest strength of the glasses-free 3D technology is that it is possible to get rid of the constraint of glasses. However, the current glasses-free 3D technology still has many deficiencies in terms of resolution, viewing angle, visible distance and so on.

The barrier 3D technology has a relatively low imaging luminance; the 3D technology using the lenticular lens and microlens array has deficiencies in viewing angle, image quality and image depth; and the directional backlight 3D technology itself is still not mature. These factors hinder the rapid development of the glasses-free 3D technology. In order to further facilitate the development of products, it is necessary to break through the current bottleneck of the glasses-free 3D technology.

SUMMARY OF THE INVENTION

The objective of the present disclosure is to provide a new projection device and a new spatial imaging method, so as to achieve the glasses-free 3D technology.

In order to achieve the above objective of the present disclosure, embodiments of the present disclosure, in a first aspect, provide a projection device. The projection device includes:

an optical fiber scanner array;

a light source, which is located on an incident light path of the optical fiber scanner array; and an adjustment and control module assembly, which is configured to couple, according to a virtual scene to be displayed, light emitted by the light source into the optical fiber scanner array, and to control the optical fiber scanner array to project pencil beams to a plurality of virtual object points corresponding to the virtual scene and located in space, such that multiple pencil beams projected to each of the plurality of virtual object points form a bundle of emitting light beams.

Optionally, the adjustment and control module assembly is specifically configured to couple light emitted from the light source into the optical fiber scanner array and to control the optical fiber scanner array to project the pencil beams to the plurality of virtual object points located in space, based on a mapping relation between spatial position information and scanning information of each virtual object point in the plurality of virtual object points corresponding to the virtual scene to be displayed, wherein the spatial position information includes direction information and depth information of the virtual object point relative to the optical fiber scanner array; and the scanning information includes at least a scanning time, a scanning angle and output energy of respective ones of a plurality of optical fiber scanning units in the optical fiber scanner array which correspond to each respective virtual object point.

Optionally, a collimating lens group array is arranged on an emergent light path of the optical fiber scanner array; or a collimating lens group is arranged on an optical fiber emergent end surface of each optical fiber scanning unit in the optical fiber scanner array.

Optionally, the projection device further includes:

one layer or more layers of microstructure elements with angular sensitivity, which are arranged on an emergent light path of the collimating lens group.

Optionally, the optical fiber emergent end surface of the optical fiber scanning unit in the optical fiber scanner array is a tapered structure.

Optionally, the adjustment and control module assembly includes a storing module, which is configured to store the mapping relation between the spatial position information and the scanning information of each virtual object point in the plurality of virtual object points corresponding to the virtual scene to be displayed.

Optionally, the adjustment and control module assembly includes a processing module, which is configured to determine the spatial position information and the scanning information of each virtual object point in the plurality of virtual object points according to the virtual scene to be displayed, and to establish the mapping relation between the spatial position information and the scanning information of each virtual object point in the plurality of virtual object points.

Optionally, the adjustment and control module assembly further includes a resolution determining module, which is configured to calculate a minimum resolution of an area to be displayed based on a resolving power parameter of a target object in a preset observation area and a distance between the preset observation area and the area to be displayed, wherein the area to be displayed is a spatial area where the plurality of virtual object points are located;

the resolution determining module is further configured to determine a resolution of the area to be displayed in a resolution range according to a user instruction or a default condition, wherein the resolution range is greater than or equal to the minimum resolution and less than or equal to a maximum resolution of the projection device; and the processing module is further configured to determine number of virtual object points corresponding to the virtual scene to be displayed according to the resolution of the area to be displayed.

The embodiments of the present disclosure, in a second aspect, provide a spatial imaging method, which is used in a projection device. The spatial imaging method includes:

extracting, from a virtual scene to be displayed, spatial position information of each virtual object point in a plurality of virtual object points corresponding to the virtual scene to be displayed, wherein the spatial position information includes direction information and depth information of the virtual object point relative to the projection device; and controlling an optical fiber scanner array in the projection device to project pencil beams to the plurality of the virtual object points according to the virtual scene to be displayed, so that multiple pencil beams projected to each of the plurality of virtual object points form a bundle of emitting light beams.

Optionally, controlling an optical fiber scanner array in the projection device to project pencil beams to the plurality of the virtual object points according to the virtual scene to be displayed includes:

controlling the optical fiber scanner array to project the pencil beams to the plurality of virtual object points according to a mapping relation between the spatial position information and a scanning information of each virtual object point in the plurality of virtual object points corresponding to the virtual scene to be displayed, wherein the scanning information includes at least a scanning time, a scanning angle and output energy of respective ones of a plurality of optical fiber scanning units corresponding to each respective virtual object point in the optical fiber scanner array.

Optionally, the mapping relation between the spatial position information and the scanning information of each virtual object point in the plurality of virtual object points is a mapping relation stored in advance in the projection device.

Optionally, a method of establishing a mapping relation of each virtual object point includes:

extracting, from the virtual scene to be displayed, energy of light emitted by each virtual object point to different angles when the virtual object point simulates a bundle of emitting light beams, so as to obtain spatial energy distribution of each virtual object point;

extracting, from the spatial energy distribution, output energy of respective ones of a plurality of optical fiber scanning units corresponding to each respective virtual object point when the plurality of optical fiber scanning units project the pencil beams to a corresponding virtual object point;

calculating, based on the spatial position information of each virtual object point, scanning angles and scanning times of respective ones of the plurality of optical fiber scanning units corresponding to each respective virtual object point when the plurality of optical fiber scanning units project the pencil beams to a corresponding virtual object point; and establishing the mapping relation based on the spatial position information, the spatial energy distribution, and scanning times, scanning angles and the output energy of the respective ones of the plurality of optical fiber scanning units corresponding to each respective virtual object point.

Optionally, the method further includes:

calculating a minimum resolution of an area to be displayed according to a resolving power parameter of a target object in a preset observation area and a distance between the preset observation area and the area to be displayed, wherein the area to be displayed is a spatial area where the plurality of virtual object points are located;

determining a resolution of the area to be displayed in a resolution range according to a user instruction or a default condition, wherein the resolution range is greater than or equal to the minimum resolution and less than or equal to a maximum resolution of the projection device; and determining number of virtual object points corresponding to the virtual scene to be displayed according to the resolution of the area to be displayed.

One or more technical solutions of the embodiments of the present disclosure have at least the following technical effects or advantages.

In the embodiments of the present disclosure, the projection device includes an optical fiber scanner array, a light source and an adjustment and control module assembly. The adjustment and control module assembly couples light emitted from the light source into the optical fiber scanner array and controls the optical fiber scanner array to project pencil beams to a plurality of virtual object points in space, so that multiple pencil beams projected to each virtual object point form a bundle of emitting light beams. When a user observes in a specific observation area, it appears that the emitting light beams are light emitted from the virtual object point. If different virtual object points in space are scanned at a high speed using light beams, human eyes perceive the light beams for high-speed scanning as continuous light beams due to a persistence of vision phenomenon of the human eyes, such that when the projection device scans the plurality of virtual object points in space at the high speed using the light beams, it appears that a virtual scene is displayed in real space. In this way, a new projection device that can realize glasses-free 3D display is provided.

BRIEF DESCRIPTION OF THE DRAWINGS

In order to explain embodiments of the present disclosure or technical solutions of existing technologies more clearly, a brief introduction to drawings that are needed in describing the embodiments or the existing technologies is made below. Obviously, the drawings in the following description only relate to some embodiments of the present disclosure. Other drawings can also be obtained based on these drawings by one ordinary skilled in the art without giving any creative work.

DETAILED DESCRIPTION OF THE EMBODIMENTS

The technical solutions in embodiments of the present disclosure will be described clearly and comprehensively below with reference to the accompanying drawings in the embodiments of the present disclosure. Obviously, the described embodiments are only some embodiments of the present disclosure, rather than all embodiments. All other embodiments obtained by one ordinary skilled in the art without making any creative effort based on the embodiments in the present disclosure all fall into the protection scope of the present disclosure.

Figure 1:
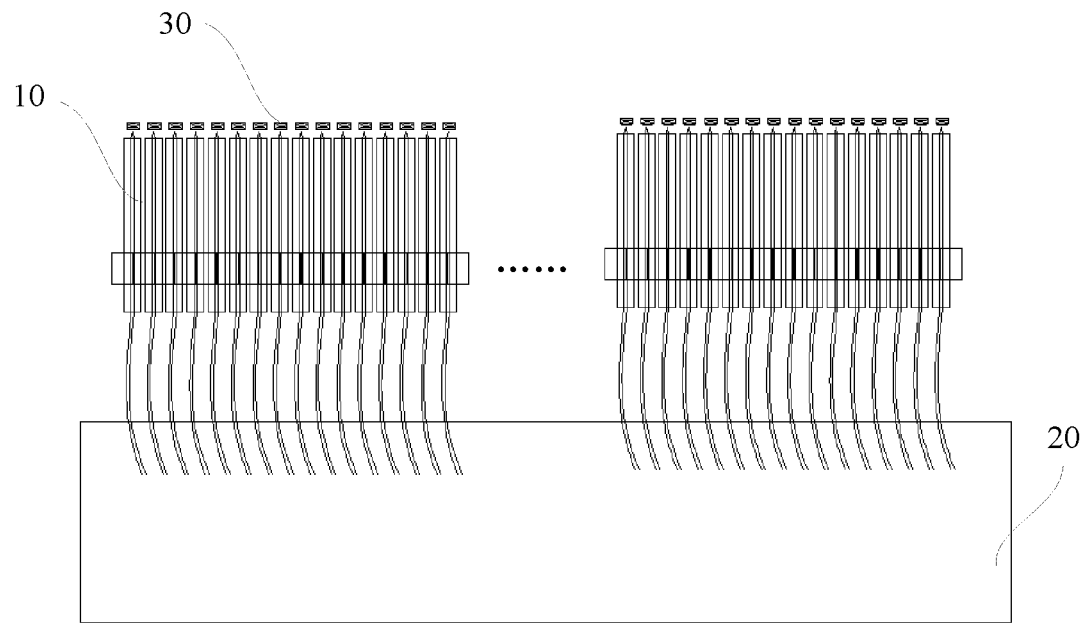
FIG. 1 schematically shows a projection device provided in an embodiment of the present disclosure.

Referring to FIG. 1, which schematically shows a projection device provided in an embodiment of the present disclosure. The projection device includes: an optical fiber scanner array 10, a light source (not shown) and an adjustment and control module assembly 20. The light source is located on an incident light path of the optical fiber scanner array 10. The adjustment and control module assembly 20 is configured to couple, according to a virtual scene to be displayed, light emitted by the light source into the optical fiber scanner array 10, and to control the optical fiber scanner array 10 to project pencil beams to a plurality of virtual object points located in space, such that multiple pencil beams projected to each virtual object point form a bundle of emitting light beams.

The optical fiber scanner array 10 is an array including a plurality of optical fiber scanning units, and the optical fiber scanner array 10 may be a one-dimensional array, a two-dimensional array, or a three-dimensional array. Each optical fiber scanning unit may project a pencil beam. The adjustment and control module assembly 20 may adjust light energy coupled into each optical fiber scanning unit, so that light energy projected by each fiber scanning unit is adjustable and controllable. An adjustment and control frequency of the adjustment and control module assembly 20 matches a required scanning frequency.

Figure 2:
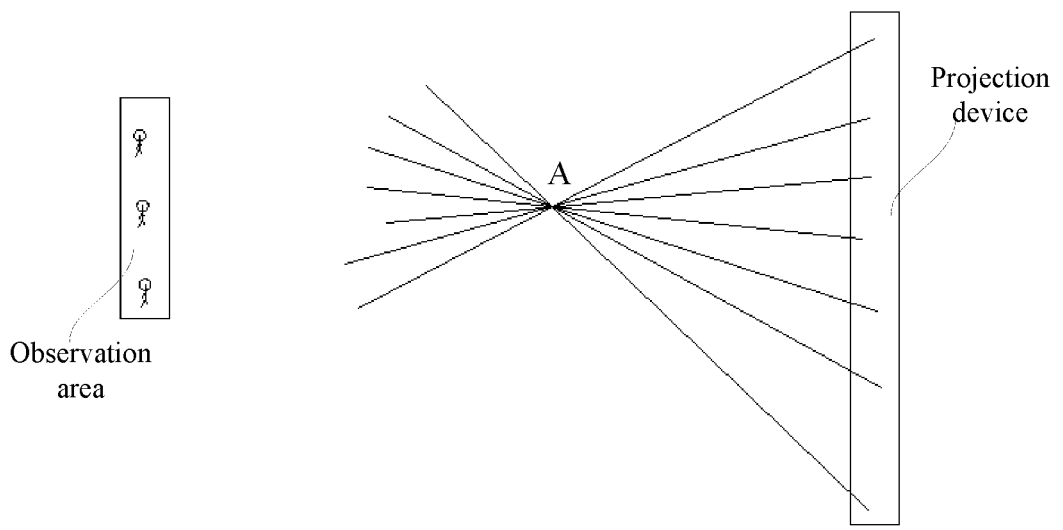
FIG. 2 schematically shows a virtual object point provided in an embodiment of the present disclosure.

In the embodiment of the present disclosure, the virtual scene may be a 2D image or a 3D image or the like. The virtual object point is not an object point which is physically present in space and capable of emitting light outwards, but refers to a virtual object point formed by multiple pencil beams projected by the scanning device to a same position A in space from different angles. When a user observes in a specific observation area, it appears that these light beams are all light emitted from the virtual object point A, as shown in FIG. 2. If different virtual object points in space are scanned at a high speed using light beams, human eyes perceive the light beams for high-speed scanning as continuous light beams due to persistence of vision of the human eyes, and the plurality of virtual object points are virtual object points that correspond to the virtual scene to be displayed. Accordingly, when the projection device scans the plurality of virtual object points in space at the high speed using the light beams, it appears that the virtual scene is displayed in real space.

In the embodiment of the present disclosure, the adjustment and control module assembly 20 is configured to couple, according to a mapping relation between spatial position information and scanning information of each virtual object point in the plurality of virtual object points, light emitted by the light source into the optical fiber scanner array 10, and to control the optical fiber scanner array 10 to project pencil beams to the plurality of virtual object points located in space. The spatial position information includes direction information and depth information of the virtual object points relative to the optical fiber scanner array 10, and the scanning information includes at least a scanning time, a scanning angle and output energy of respective ones of a plurality of optical fiber scanning units in the optical fiber scanner array 10 which correspond to each respective virtual object point.

First, a method of establishing the mapping relation between the spatial position information and the scanning information of each virtual object point in the embodiment of the present disclosure is described.

A first possible implementation manner is as follows. The adjustment and control module assembly 20 includes a processing module, which is configured to determine spatial position information and scanning information of each virtual object point in the plurality of virtual object points according to the virtual scene to be displayed, and to establish a mapping relation between the spatial position information and the scanning information of each virtual object point in the plurality of virtual object points.

In the first possible implementation manner, the projection device can establish the mapping relation between the spatial position information and the scanning information of each virtual object point in the virtual scene to be displayed through real-time calculation, thereby projecting any virtual scene to the space, such as a changing image, a video, and the like.

Specifically, the virtual scene to be displayed may be a 2D image or a 3D image or the like. The virtual scene to be displayed may be stored in advance in the projection device, or may be obtained from other devices or downloaded over a network. The present disclosure is not limited in this respect.

After the virtual scene to be displayed is determined, if the virtual scene to be displayed is a 3D image, since the 3D image includes depth information of each pixel point and relative position relations among the pixel points, the depth information of each pixel point may be directly extracted as depth information of a corresponding virtual object point when spatial position information of each virtual object point is extracted from the virtual scene. Then, direction information of a reference virtual object point corresponding to a reference pixel point relative to the optical fiber scanner array 10 is determined, so that based on a relative position relation between the direction information of the reference virtual object point and the pixel point, a position relation between each virtual object point and the reference virtual object point is determined, so as to determine direction information of each virtual object point relative to the projection device. The direction information of the reference virtual object point relative to the optical fiber scanner array 10 may be set by one skilled in the art according to the observation area where a user is located, so that a display effect is relatively good when the user observes in the observation area.

If the virtual scene to be displayed is a 2D image, since the 2D image itself does not include depth information, when spatial position information of the 2D image is to be determined, the depth information of the 2D image when being displayed, i.e., a distance between an image display position and the projection device, may be set according to actual needs. For example, if it is needed that an image be displayed at a position 5 m from the projection device, a depth of the 2D image may be set to 5 m. With regard to direction information of the 2D image, it is determined by using the same method for determining the direction information of the 3D image, and the method will not be described in detail herein.

Then, energy of light beams emitted by each virtual object point to different angles when the virtual object point simulates a bundle of emitting light beams is extracted from the virtual scene to be displayed so as to obtain spatial energy distribution of each virtual object point, and output energy of respective ones of the plurality of optical fiber scanning units corresponding to each respective virtual object point when the plurality of optical fiber scanning units project the pencil beams to the virtual object point is extracted from the spatial energy distribution of each virtual object point, so as to adjust output energy of each optical fiber scanning unit. Further, based on the spatial position information of each virtual object point, scanning angles and scanning times of respective ones of the plurality of optical fiber scanning units corresponding to each respective virtual object point are calculated. For example, it is assumed that when simulating a bundle of emitting light beams, the virtual object point A corresponds to 100 optical fiber scanning units. Output energy of the 100 fiber scanning units when the 100 fiber scanning units project pencil beams to the virtual object point A needs to be determined, and then scanning angles and scanning times of the 100 optical fiber scanning units are calculated based on spatial position information of the virtual object point A.

And further, the adjustment and control module 20 establishes the mapping relation between the spatial position information and the scanning information of each virtual object point in the plurality of virtual object points based on the spatial position information and the scanning information of each virtual object point in the plurality of virtual object points corresponding to the virtual scene to be displayed. In a specific implementation process, the mapping relation may be stored in the projection device in the form of a mapping table, and the present disclosure is not limited herein in this respect.

In the first possible implementation manner, the processing module further needs to determine the number of virtual object points in an area to be displayed (i.e., the number of the virtual object points corresponding to the virtual scene to be displayed) before establishing the mapping relation between the spatial position information and the scanning information of each virtual object point in the plurality of virtual object points. Here, the area to be displayed refers to a spatial area where a plurality of virtual object points are located, i.e., an area where the virtual scene is displayed.

In the embodiment of the present disclosure, the adjustment and control module assembly 20 includes a resolution determination module which is configured to calculate a minimum resolution of the area to be displayed based on a resolving power parameter of a target object in a preset observation area and a distance between the preset observation area and the area to be displayed.

Specifically, the resolution determination module calculates a maximum light spot size of each pixel in the area to be displayed based on the resolving power parameter of the target object in the preset observation area and the distance between the preset observation area and the area to be displayed, and then divides a preset size of the area to be displayed by the maximum spot size to obtain the minimum resolution.

The resolving power parameter of the target object refers to an angular resolving power parameter of the human eyes. Here, angular resolving power is also called angular resolution, which refers to an ability of an imaging system or a system element to form distinguishable images of two adjacent objects separated by a minimal distance. The angular resolving power of the human eyes is generally from 1 minute to 2 minutes, minute being a unit of angle, and one skilled in the art can set the resolving power parameter according to an actual situation.

Furthermore, the resolution determination module is further configured to determine a resolution of the area to be displayed in a resolution range according to a user instruction or a default condition. The resolution range is greater than or equal to the abovementioned minimum resolution and less than or equal to a maximum resolution of the projection device.

Specifically, the user instruction refers to an instruction of resolution input by the user. In practical applications, the resolution of the area to be displayed may be determined according to actual needs. It is certain that the higher the resolution is, the better the display effect of the virtual scene is, but the higher a requirement for the projection device is.

The default condition refers to the default condition in the projection device, and the projection device automatically determines the resolution according to the default condition with no need of the user's input. For example, when the resolution of the virtual scene to be displayed is not within the resolution range and greater than the maximum resolution, it may be determined that the resolution of the area to be displayed is the maximum resolution or close to the maximum resolution. As another example, when the resolution of the virtual scene to be displayed is not within the resolution range and is smaller than the minimum resolution, it may be determined that the resolution of the area to be displayed is the minimum resolution or close to the minimum resolution. When the resolution of the virtual scene to be displayed is within the resolution range, it may be determined that the resolution of the area to be displayed is the resolution of the virtual scene to be displayed.

Then, the processing module determines the number of the virtual object points corresponding to the virtual scene to be displayed according to the resolution of the area to be displayed. Here, the resolution of the area to be displayed is the same as the number of the virtual object points corresponding to the virtual scene to be displayed.

After the resolution of the area to be displayed is determined, if the resolution of the area to be displayed is different from the resolution of the virtual scene to be displayed, the projection device may adjust the resolution of the virtual scene according to the resolution of the area to be displayed so that an adjusted resolution of the virtual scene matches the resolution of the area to be displayed.

A second possible implementation manner is as follows. The adjustment and control module assembly 20 includes a storage module, which is configured to store the mapping relation of the spatial position information and the scanning information of each virtual object point in the plurality of virtual object points corresponding to the virtual scene to be displayed. In the present embodiment, the virtual scene to be displayed may be fixed, so the mapping relation may be stored in advance in the projection device in a manner of establishing the mapping relation offline. In a specific implementation process, the mapping relation may be established in advance by the projection device or established by other computing devices. A method for establishing the mapping relation is the same as the method in the first possible implementation manner, and is not repeated herein.

In a specific implementation process, after the mapping relation between the spatial position information and the scanning information of each virtual object point is established, the mapping relation between the spatial position information and the scanning information of each virtual object point may be stored in the projection device in the form of a mapping table. In this way, when the virtual scene is projected, the adjustment and control module assembly 20 couples light emitted by the light source into the fiber scanner array 10 according to the mapping table of the mapping relation between the spatial position information and the scanning information of each virtual object point, and controls the optical fiber scanner array 10 to project the pencil beams to the plurality of virtual object points in space, thereby displaying the virtual scene in space.

In the second possible implementation manner, a resolution range of an area to be displayed may be stored in the projection device. The area to be displayed refers to a spatial area where a plurality of virtual object points are located. If the number of virtual object points included in the mapping relation is within the resolution range of the area to be displayed, the number of the virtual object points should be greater than or equal to a minimum resolution of the area to be displayed and smaller than or equal to a maximum resolution of the projection device, so as to guarantee an observation effect on the premise that the projection device can realize it. Here, a method for calculating the minimum resolution of the area to be displayed is the same as that in the first possible implementation manner, and is not repeated herein.

In the embodiment of the present disclosure, after the mapping relation is determined according to the first possible implementation manner or the second possible implementation manner, the projection device scans the virtual object points in space using the pencil beams according to the above mapping relation. The projection device may perform scanning in a manner such as a progressive scanning manner or an interlaced scanning manner. For example, if the scanning manner is the progressive scanning manner, for three adjacent virtual object points A, B and C in a same row, the virtual object points A, B and C are scanned in sequence; and after one row is scanned, a next row is scanned until all the virtual object points in space are scanned.

In other possible embodiments, the projection device may also perform scanning in other manners, for example, column by column or area by area, until all the virtual object points in space are scanned, and the present disclosure is not limited in this respect.

Figure 3:
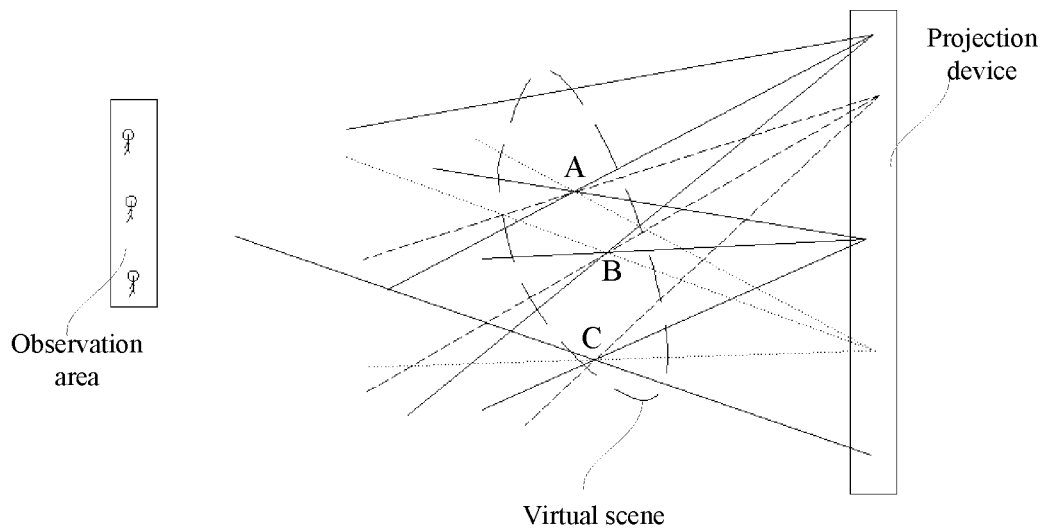
FIG. 3 schematically shows a virtual scene provided in an embodiment of the present disclosure.

In the embodiment of the present disclosure, the projection device can sequentially scan the virtual object points in space according to a time sequence, i.e., a chronological order. For example, as shown in FIG. 3, A, B and C are three virtual object points in space corresponding to the virtual scene to be displayed. At a first scanning time, the projection device controls a plurality of optical fiber scanning units corresponding to the virtual object point A to project pencil beams to the point A in space according to respective scanning angles and output energy thereof, thereby forming a bundle of emitting light beams at the point A. At a second scanning time, the projection device controls a plurality of optical fiber scanning units corresponding to the virtual object point B to project pencil beams to the point B in space according to respective scanning angles and output energy thereof, thereby forming a bundle of emitting light beams at the point B. At a third scanning time, the projection device controls a plurality of optical fiber scanning units corresponding to the virtual object point C to project pencil beams to the point C in space according to respective scanning angles and output energy thereof, thereby forming a bundle of emitting light beams at the point C, and so on. The projection device performs high-speed scanning to all virtual object points corresponding to the virtual scene so as to complete scanning of one frame of image. When a frame rate of scanning performed by the projection device reaches 16 frames per second or higher, the human eyes perceive that a displayed image is coherent, so that the virtual scene is displayed in space by means of the projection device; and moreover, different virtual object points have different depths in space, so that a stereoscopic 3D image may be formed.

In a specific implementation process, the projection device may either perform scanning to one virtual object point in space at one time or perform scanning to a plurality of virtual object points in space simultaneously at one time, and the present disclosure is not limited in this respect. In this way, according to a possible implementation manner, when the projection device performs scanning to a plurality of virtual object points in space simultaneously at one time, the optical fiber scanner array 10 may be divided into a plurality of different small arrays, and a plurality of small arrays perform scanning to a plurality of virtual object points in space simultaneously so as to improve a scanning frequency of the projection device.

Currently, a scanning frequency of an optical fiber may reach 24 kHz or higher. When the optical fiber scanner array 10 performs scanning, by setting an appropriate resolution, a frame rate of an image displayed in space may be higher than 16 frames per second, so that an observer perceives that the image projected by the projection device is coherent.

In the embodiment of the present disclosure, the optical fiber scanning unit may be composed of a piezoelectric ceramic and an optical fiber, so that the scanning angle of the optical fiber scanning unit is controlled by using a piezoelectric effect of the piezoelectric ceramic.

Figure 4:
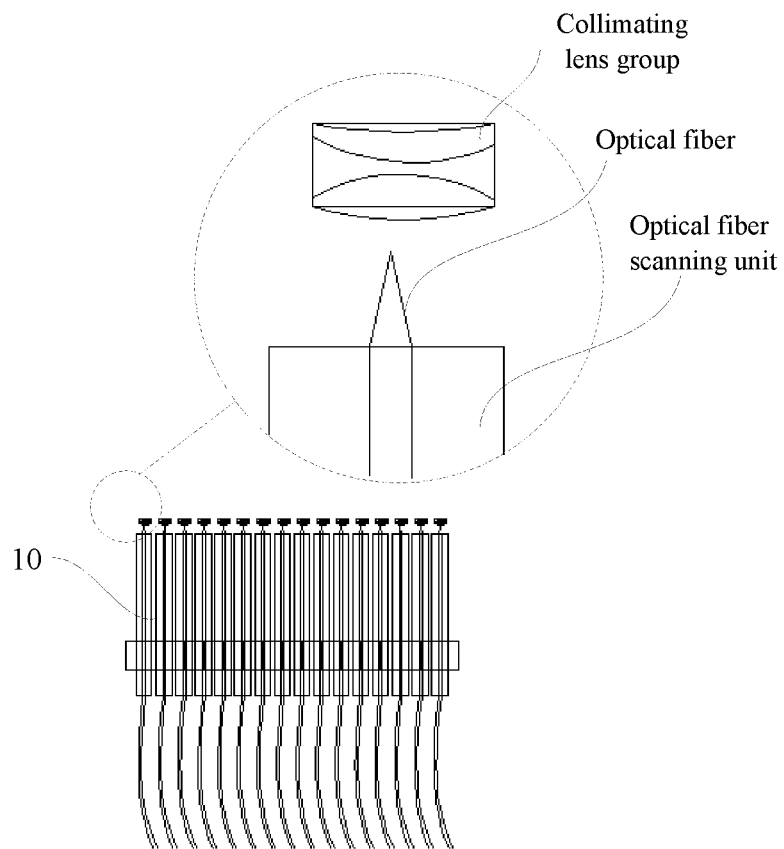
FIG. 4 schematically shows a possible optical fiber scanning unit and a possible collimating lens group.
Figure 5:
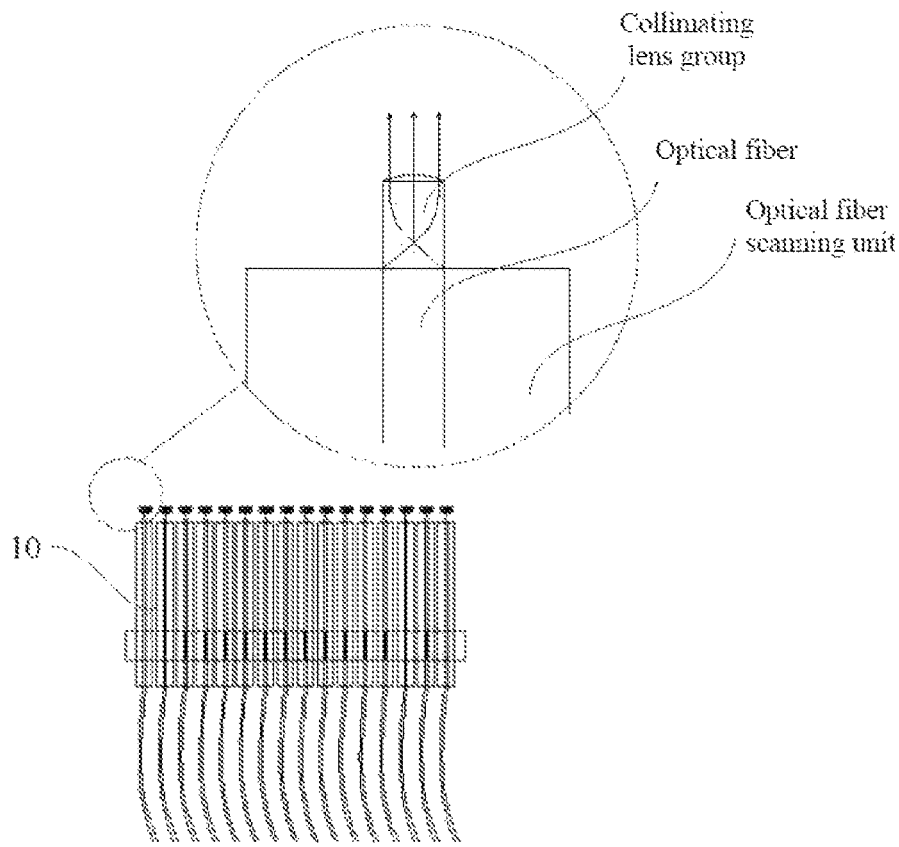
FIG. 5 schematically shows another possible optical fiber scanning unit and another possible collimating lens group.

In the embodiment of the present disclosure, to ensure a degree of collimation of the light beam, according to one possible implementation manner, as shown in FIG. 1, the projection device further includes a collimating lens group array 30. The collimating lens group array 30 is arranged on an emergent light path of the optical fiber scanner array 10. FIG. 4 schematically shows a single optical fiber scanning unit and a collimating lens group provided in the embodiment of the disclosure. In the present embodiment, the fiber scanner array 10 may be arranged in a curved shape, thereby reducing a burden of the optical fiber scanning unit and the collimating lens group. In another possible implementation manner, as shown in FIG. 5, each optical fiber scanning unit in the optical fiber scanner array 10 includes: a collimating lens group, which is arranged on an optical fiber emergent end face of the optical fiber scanning unit. In the above implementation manner, the collimating lens group collimates and angularly enlarges a point light source formed by scanning the optical fiber scanning unit, and each scanning light spot corresponds to a pencil beam emitted from a virtual object point of the virtual scene.

In the embodiment of the present disclosure, in order to improve a degree of collimation of the pencil beam, according to one possible implementation manner, a lens fiber optical fiber may be used as the optical fiber. That is, the optical fiber emergent end face is treated so as to form a tapered structure. For example, tapering is performed to the optical fiber emergent end face so as to form an aspheric conical structure, thereby reducing light spots exiting from an optical fiber.

In the embodiment of the present disclosure, in order to improve the degree of collimation of the pencil beam so as to improve the resolution of the virtual object point, the following manner may also be used. At an emergent light path of the collimating lens group, i.e., at an end thereof far away from the optical fiber, one layer or more layers of microstructure elements with angular sensitivity are arranged. In this way, the microstructure elements with angular sensitivity can efficiently diffract light of a particular angle, thereby improving the degree of collimation of the light beam.

In the embodiment of the present disclosure, the light source may be a laser diode, an LED (light emitting diode) light source and the like, and the present disclosure is not limited in this respect.

Figure 6:
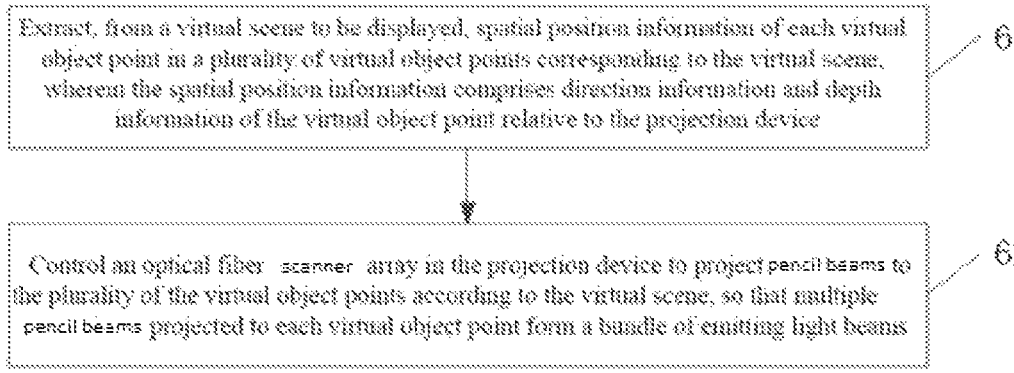
FIG. 6 schematically shows a flowchart of a spatial imaging method provided in an embodiment of the present disclosure.

Based on the same inventive concept, an embodiment of the present disclosure further provides a spatial imaging method useable for a projection device. As shown in FIG. 6, the spatial imaging method mainly includes step 60 and step 61.

At step 60, spatial position information of each virtual object point in a plurality of virtual object points corresponding to a virtual scene to be displayed is extracted from the virtual scene to be displayed. The spatial position information includes direction information and depth information of the virtual object point relative to the projection device.

At step 61, an optical fiber scanner array in the projection device is controlled to project pencil beams to the plurality of the virtual object points according to the virtual scene to be displayed, so that multiple pencil beams projected to each virtual object point form a bundle of emitting light beams.

Optionally, the optical fiber scanner array in the projection device being controlled to project pencil beams to the plurality of the virtual object points according to the virtual scene to be displayed includes:

controlling the optical fiber scanner array to project the pencil beams to the plurality of virtual object points according to a mapping relation between the spatial position information and a scanning information of each virtual object point in the plurality of virtual object points corresponding to the virtual scene to be displayed, wherein the scanning information includes at least a scanning time, a scanning angle and output energy of each of a plurality of optical fiber scanning units corresponding to each respective virtual object point in the optical fiber scanner array.

Optionally, the mapping relation between the spatial position information and the scanning information of each virtual object point in the plurality of virtual object points is a mapping relation stored in advance in the projection device.

Optionally, a method of establishing a mapping relation of each virtual object point includes:

extracting, from the virtual scene to be displayed, energy of light emitted by each virtual object point to different angles when the virtual object point simulates the bundle of emitting light beams, so as to obtain spatial energy distribution of each virtual object point;

extracting, from the spatial energy distribution, output energy of respective ones of the plurality of optical fiber scanning units corresponding to each respective virtual object point when the plurality of optical fiber scanning units project the pencil beams to a corresponding virtual object point;

calculating, based on the spatial position information of each virtual object point, scanning angles and scanning times of respective ones of the plurality of optical fiber scanning units corresponding to each respective virtual object point when the plurality of optical fiber scanning units project the pencil beams to a corresponding virtual object point; and establishing the mapping relation based on the spatial position information, the spatial energy distribution, and scanning times, scanning angles and output energy of the plurality of optical fiber scanning units corresponding to each respective virtual object point.

Optionally, the method further includes:

calculating a minimum resolution of an area to be displayed according to a resolving power parameter of a target object in a preset observation area and a distance between the preset observation area and the area to be displayed, wherein the area to be displayed is a spatial area where the plurality of virtual object points are located;

determining a resolution of the area to be displayed in a resolution range according to a user instruction or a default condition, wherein the resolution range is greater than or equal to the minimum resolution and less than or equal to a maximum resolution of the projection device; and determining the number of virtual object points corresponding to the virtual scene to be displayed according to the resolution of the area to be displayed.

Various variations and specific examples in the embodiment of the aforementioned projection device are equally applicable to the spatial imaging method of the present embodiment. Based on the foregoing detailed description of the projection device, one skilled in the art can clearly know an implementation manner of the spatial imaging method in the present embodiment, which will not be described in detail herein for brevity of the description.

One or more technical solutions of the embodiments of the present disclosure have at least the following technical effects or advantages.

In the embodiments of the present disclosure, the projection device includes an optical fiber scanner array, a light source and an adjustment and control module assembly. The adjustment and control module assembly couples light emitted from the light source into the optical fiber scanner array and controls the optical fiber scanner array to project pencil beams to a plurality of virtual object points in space, so that multiple pencil beams projected to each virtual object point form a bundle of emitting light beams. When a user observes in a specific observation area, it appears that the bundle of emitting light beams is light emitted from the virtual object point. If different virtual object points in space are scanned at a high speed using light beams, human eyes perceive the light beams for high-speed scanning as continuous light beams due to a persistence of vision phenomenon of the human eyes, such that when the projection device scans the plurality of virtual object points in space at the high speed using the light beams, it appears that a virtual scene is displayed in real space. In this way, a new projection device that can realize glasses-free 3D display is provided.

All features or steps in all methods or processes disclosed in the present description may be combined in any manner excluding the case that features and/or steps are contradictory with each other.

Any feature disclosed in this description (including any additional claims, the abstract and drawings), unless specifically stated, may be replaced by other equivalent or alternative features having a similar purpose. That is, unless specifically stated, each feature is only an example of a series of equivalent or similar features.

The present disclosure is not limited to the specific implementation manners described above. The present disclosure extends to any new feature or any new combination disclosed in the present description, as well as steps of any new method or process disclosed or any new combinations.

The invention claimed is:

1. A projection device, comprising:
an optical fiber scanner array;
a light source, which is located on an incident light path of the optical fiber scanner array; and
an adjustment and control module assembly, which is configured to couple, according to a virtual scene to be displayed, light emitted by the light source into the optical fiber scanner array, and to control the optical fiber scanner array to project pencil beams to a plurality of virtual object points corresponding to the virtual scene and located in space, such that multiple pencil beams projected to each of the plurality of virtual object points form a bundle of emitting light beams,
wherein the adjustment and control module assembly is specifically configured to couple light emitted from the light source into the optical fiber scanner array and to control the optical fiber scanner array to project the pencil beams to the plurality of virtual object points located in space, based on a mapping relation between spatial position information and scanning information of each virtual object point in the plurality of virtual object points corresponding to the virtual scene to be displayed, and the spatial position information comprises direction information and depth information of the virtual object point relative to the optical fiber scanner array; and the scanning information comprises at least a scanning time, a scanning angle, and output energy of respective ones of a plurality of optical fiber scanning units in the optical fiber scanner array which correspond to each respective virtual object point.

2. The projection device according to claim 1, wherein
a collimating lens group array is arranged on an emergent light path of the optical fiber scanner array; or
a collimating lens group is arranged on an optical fiber emergent end surface of each optical fiber scanning unit in the optical fiber scanner array.

3. The projection device according to claim 2, further comprising:
one layer or more layers of microstructure elements with angular sensitivity, which are arranged on an emergent light path of the collimating lens group.

4. The projection device according to claim 2, wherein the optical fiber emergent end surface of the optical fiber scanning unit in the optical fiber scanner array is a tapered structure.

5. The projection device according to claim 1, wherein the adjustment and control module assembly comprises a storing module, which is configured to store the mapping relation between the spatial position information and the scanning information of each virtual object point in the plurality of virtual object points corresponding to the virtual scene to be displayed.

6. The projection device according to claim 1, wherein the adjustment and control module assembly comprises a processing module, which is configured to determine the spatial position information and the scanning information of each virtual object point in the plurality of virtual object points according to the virtual scene to be displayed, and to establish the mapping relation between the spatial position information and the scanning information of each virtual object point in the plurality of virtual object points.

7. The projection device according to claim 6, wherein the adjustment and control module assembly further comprises a resolution determining module, which is configured to calculate a minimum resolution of an area to be displayed based on a resolving power parameter of a target object in a preset observation area and a distance between the preset observation area and the area to be displayed, wherein the area to be displayed is a spatial area where the plurality of virtual object points are located;
the resolution determining module is further configured to determine a resolution of the area to be displayed in a resolution range according to a user instruction or a default condition, wherein the resolution range is greater than or equal to the minimum resolution and less than or equal to a maximum resolution of the projection device; and
the processing module is further configured to determine number of virtual object points corresponding to the virtual scene to be displayed according to the resolution of the area to be displayed.

8. A spatial imaging method, which is used in a projection device, wherein the spatial imaging method comprises:
extracting, from a virtual scene to be displayed, spatial position information of each virtual object point in a plurality of virtual object points corresponding to the virtual scene to be displayed, wherein the spatial position information comprises direction information and depth information of the virtual object point relative to the projection device; and
controlling an optical fiber scanner array in the projection device to project pencil beams to the plurality of the virtual object points according to the virtual scene to be displayed, so that multiple pencil beams projected to each of the plurality of virtual object points form a bundle of emitting light beams,
wherein controlling an optical fiber scanner array in the projection device to project pencil beams to the plurality of the virtual object points according to the virtual scene to be displayed comprises:
controlling the optical fiber scanner array to project the pencil beams to the plurality of virtual object points according to a mapping relation between the spatial position information and a scanning information of each virtual object point in the plurality of virtual object points corresponding to the virtual scene to be displayed, and
the scanning information comprises at least a scanning time, a scanning angle and output energy of respective ones of a plurality of optical fiber scanning units corresponding to each respective virtual object point in the optical fiber scanner array.

9. The method according to claim 8, the mapping relation between the spatial position information and the scanning information of each virtual object point in the plurality of virtual object points is a mapping relation stored in advance in the projection device.

10. The method according to claim 8, wherein a method of establishing a mapping relation of each virtual object point comprises:
extracting, from the virtual scene to be displayed, energy of light emitted by each virtual object point to different angles when the virtual object point simulates a bundle of emitting light beams, so as to obtain spatial energy distribution of each virtual object point;
extracting, from the spatial energy distribution, output energy of respective ones of a plurality of optical fiber scanning units corresponding to each respective virtual object point when the plurality of optical fiber scanning units project the pencil beams to a corresponding virtual object point;
calculating, based on the spatial position information of each virtual object point, scanning angles and scanning times of respective ones of the plurality of optical fiber scanning units corresponding to each respective virtual object point when the plurality of optical fiber scanning units project the pencil beams to a corresponding virtual object point; and
establishing the mapping relation based on the spatial position information, the spatial energy distribution, and scanning times, scanning angles and the output energy of the respective ones of the plurality of optical fiber scanning units corresponding to each respective virtual object point.

11. The method according to claim 10, further comprising:
calculating a minimum resolution of an area to be displayed according to a resolving power parameter of a target object in a preset observation area and a distance between the preset observation area and the area to be displayed, wherein the area to be displayed is a spatial area where the plurality of virtual object points are located;

determining a resolution of the area to be displayed in a resolution range according to a user instruction or a default condition, wherein the resolution range is greater than or equal to the minimum resolution and less than or equal to a maximum resolution of the projection device; and determining number of virtual object points corresponding to the virtual scene to be displayed according to the resolution of the area to be displayed.

12. The method according to claim 9, wherein a method of establishing a mapping relation of each virtual object point comprises:

extracting, from the virtual scene to be displayed, energy of light emitted by each virtual object point to different angles when the virtual object point simulates a bundle of emitting light beams, so as to obtain spatial energy distribution of each virtual object point;

extracting, from the spatial energy distribution, output energy of respective ones of a plurality of optical fiber scanning units corresponding to each respective virtual object point when the plurality of optical fiber scanning units project the pencil beams to a corresponding virtual object point;

calculating, based on the spatial position information of each virtual object point, scanning angles and scanning times of respective ones of the plurality of optical fiber scanning units corresponding to each respective virtual object point when the plurality of optical fiber scanning units project the pencil beams to a corresponding virtual object point; and establishing the mapping relation based on the spatial position information, the spatial energy distribution, and scanning times, scanning angles and the output energy of the respective ones of the plurality of optical fiber scanning units corresponding to each respective virtual object point.

* * * * *